United States Patent [19]
Hallqvist

[11] Patent Number: 6,081,703
[45] Date of Patent: Jun. 27, 2000

[54] COMMUNICATION SYSTEM INCLUDING DEBITING PROVISIONS FOR COMMUNICATING WITH A SUBSYSTEM THAT CHARGES A FEE

[75] Inventor: Per Hallqvist, Upplands Väsby, Sweden

[73] Assignee: Telia Research AB, Haninge, Sweden

[21] Appl. No.: 08/957,391

[22] Filed: Oct. 23, 1997

Related U.S. Application Data

[63] Continuation of application No. 08/527,922, Sep. 14, 1995, abandoned.

[51] Int. Cl.[7] ................................................. H04Q 7/20
[52] U.S. Cl. ................................................. 455/406; 455/405
[58] Field of Search .............................. 455/405, 406; 379/111, 121, 114, 123, 124

[56] References Cited

U.S. PATENT DOCUMENTS

| | | | |
|---|---|---|---|
| 5,351,286 | 9/1994 | Nici | 379/93.03 |
| 5,359,642 | 10/1994 | Castro | 379/121 |
| 5,475,738 | 12/1995 | Penzias | 379/88.14 |
| 5,826,185 | 10/1998 | Wise et al. | 455/406 |
| 5,854,975 | 12/1998 | Fougnies et al. | 455/406 |

*Primary Examiner*—Dwayne D. Boost
*Assistant Examiner*—Myron K. Wyche
*Attorney, Agent, or Firm*—Oblon, Spivak, McClelland, Maier & Neustadt, P.C.

[57] ABSTRACT

The present invention relates to a device for debiting of messages transmitted from a local network, A, to a public network, B. The user in the local network obtain or purchase stamps which can be used in connection with message transmission between the two networks. The stamps are purchased from subscriber equipments in the public network, B. The stamps are stored in a stamp register, where each stamp is given a unique number, date of issue, and to whom it has been issued, and time of validity. In connection with the use of the stamps the user state the stamp number which is identified by the system which in connection with the message transmission delete the mentioned stamp from the stamp register. The debiting for the stamps are made either at the purchase or in connection with the use of the stamps. Stamps which have been paid in advance and which have not been used within one in advance prescribed time of validity causes a repayment to the subscriber in the public network. The repayment can relate to the whole cost of the stamp or part thereof.

19 Claims, 3 Drawing Sheets

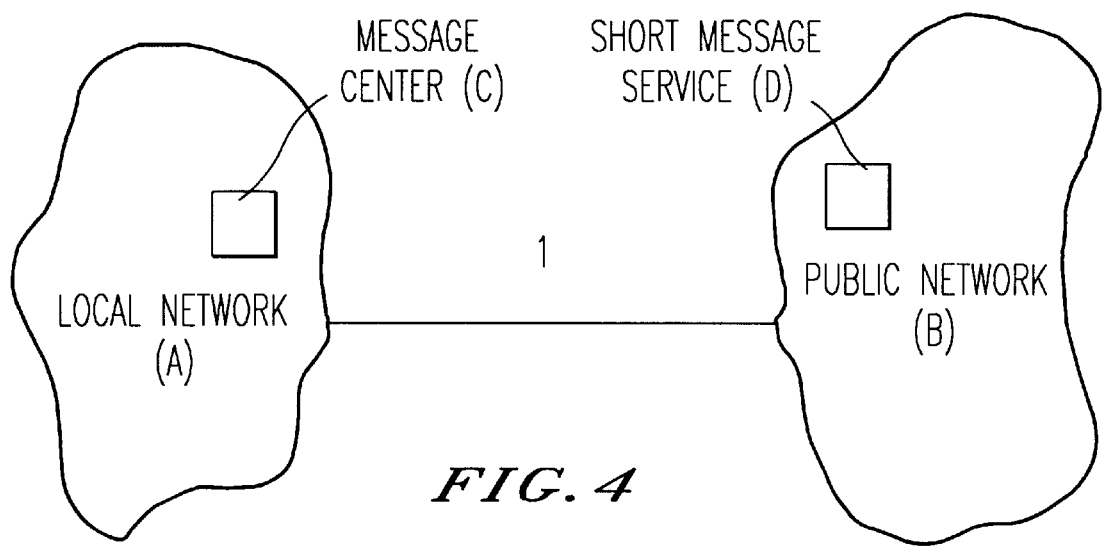
FIG. 4
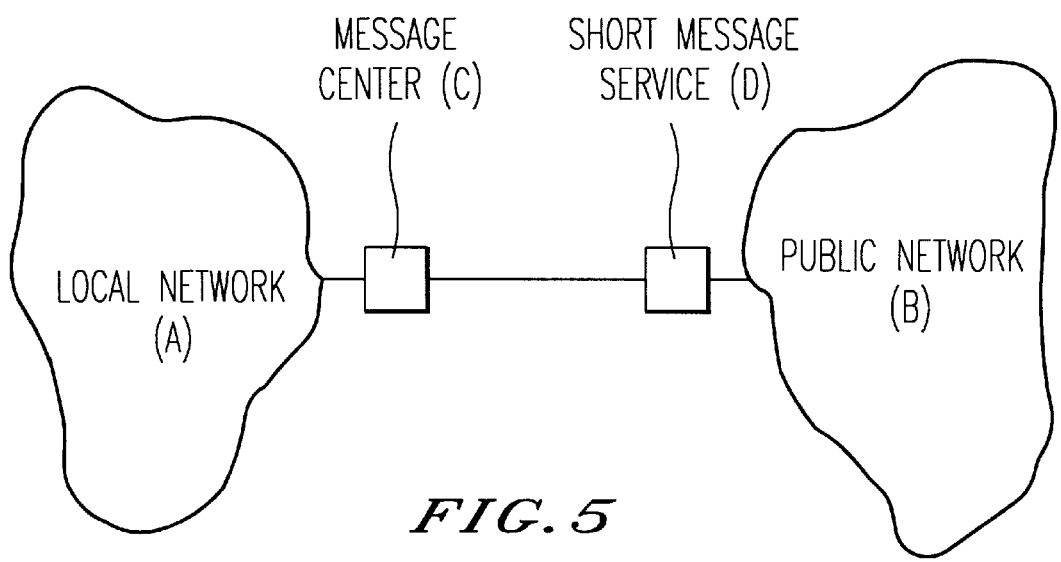
FIG. 5
| STAMP NUMBER | DATE OF ISSUE | ISSUED TO | TIME OF VALIDITY | OTHERS |
|---|---|---|---|---|
|  |  |  |  |  |
|  |  |  |  |  |
|  |  |  |  |  |
FIG. 9

COMMUNICATION SYSTEM INCLUDING DEBITING PROVISIONS FOR COMMUNICATING WITH A SUBSYSTEM THAT CHARGES A FEE

This application is a continuation of application Ser. No. 08/527,922, filed on Sep. 14, 1995, now abandoned.

TECHNICAL FIELD

The present invention relates to a telecommunication system comprising different networks. The networks consist of local networks respective telecommunication networks. In the telecommunication networks information is transmitted mostly verbally but also text information can be transmitted in the mentioned network. In the local one, for instance Internet, information is transmitted in the form of text between computers of different kinds. In the local network information interchange is performed without debiting being made in the mentioned network. In telecommunication networks anyone who establish a connection will be debited in connection with a communication. The telecommunication network can consist of just any telecommunication network. The telecommunication network shall however be equipped with terminals which can receive text messages, respective transmit text messages to a limited extent.

PRIOR ART

Telecommunication in the telecommunication networks of today are to an ever larger extent performed within and between different networks. Accordingly information interchange is made between different telecommunication networks for mainly verbal communication between different countries and between different operators within one and the same country. Further, the variety of local networks is growing, for instance Internet, where information interchange is made between computers or similar terminals in the network. The information interchange between the terminals in the local network is made with text information. Connections between local networks and public networks are made to an ever growing extent. In the public networks a debiting is made in connection with the information interchange. In the local networks there are normally no debiting for the use of the network.

Electronic mail (E-mail) has become a more and more spread phenomenon in the telecommunication systems of today where in principle all newpapers, news programs, companies are connected to Internet. E-mail to and from GSM-telephones are to some extent already technically prepared by an SMS-Internet connection being offered in the message center. SMS means Short Message Service and is a function which makes it possible on one hand to receive text messages from GSM-telephone, which text is shown on the display, and on the other to write a text message on the telephone which is transmitted over the network. The message center can be described as an exchange through which all SMS-messages are passing. An SMS-message can, if the subscriber wants, be changed over to fax, E-mail etc, depending on the existing functionality in the message center.

DESCRIPTION OF THE INVENTION

TECHNICAL PROBLEM

In connection with transmission of E-mail from Internet to SMS a debiting shall be made. How this shall be performed is however not solved. In connection with this the following problem can be identified.

Internet, the local network (and by that the service E-mail) has no system for debiting.

The user address of an E-mail is not a safe identification. A person with for instance good knowledge of UNIX can today in most UNIX-environments transmit mail and himself/herself choose and use user address inclusive domain without root authorization.

Even if the identification was safe, the debiting procedure would be complicated.

E-mail may always be supposed to be tapped as it is passing a number of computer nodes, the system operators of which have possibility to tap the information.

The other possibility is that the GSM-subscriber is always debited for received mails, irrespective of if he is sender or receiver. This solution is however not attractive because the receiver can be heavily debited for messages which are sent to him without the receiver requiring to get the messages. Examples of such messages are advertising offers and the like, which in such a system could be transmitted without restraint, because the advertiser in this case need not pay anything.

The present invention intends to give solution for the mentioned problems.

THE SOLUTION

The present invention relates to a communication system in which system first and second equipments are connected. The first equipments are in the main intended for verbal communication and the second equipments for text information. The first equipments are mainly intended for information interchange between themselves, and the second equipments for information interchange between themselves. The first equipments are however arranged for restricted information interchange of text. The text is created respective shown on a display with restricted space for information interchange. The communication system is further equipped with system for debiting of communication, arranged from the first equipments. Debiting is on the other hand not made for information interchange between second equipments. In the case information interchange shall be performed from the second equipment to the first equipments, the second equipment shall however in one way or another be debited for the communication. In the communication system a payment register is arranged for users of the equipments in the communication system. The users in the first communication system are arranged to, on payment, get a, corresponding to the payment, number of charging intervals. The charging intervals are entered on the user, who is using the charging intervals at transmission of text information from the second equipments to the first equipments. The communication system further takes out the charging intervals depending on the user's use of the communication system, and that the user is refused information interchange if registered charging intervals are lacking. In further development of the invention the charging intervals are called stamps and are arranged to be used by the user at the use of the first or second equipments. At purchase of the stamps the user is arranged to receive an individual code for the taking out of stamps. The user is further allowed to use the stamps in connection with the use of certain appointed equipment/equipments. In further development of the invention the user is allowed to use the stamps or certain appointed stamps at communication with an appointed extension/equipment.

In further development of the invention a user of the first equipments is in connection with communication with any of the other equipments arranged to allot the receiver one or more stamps intended to be used by the receiver in connection with transmission of reply message to the sender. The communication system is further arranged to comprise a public telecommunication network to which the first equipments are connected, and a local network, for instance Internet, to which the second equipments are connected. The payment register is connected to or in the local network. The payment register is further arranged between the public network and the local network.

The payment register is further arranged to be a part of a message register which is arranged between the public network and the local network. In or in connection to the public network a text managing function is arranged to manage text information to/from the first equipments. The public network consists of a mobile telecommunication system which for instance can be digital of GSM-type. A text managing function is further connected to or in the public network for managing of text information to/from the first equipments. In the payment register is further allowed for instance stamp allotted numbers, date of issue, to whom it is issued, and time of validity etc. In connection with that the user receives the stamps, a key is received for each stamp. The key is intended to be used by the user at the taking out of the stamp/stamps. The first equipments are further equipped with for instance display for showing respective creating of messages. The display allows that the messages have a restricted scope. Stamps which are not used within defined time are declared used up by the system and repayment corresponding to parts or the whole of the value of the stamp is made to the one who has ordered the issue of the mentioned stamps.

ADVANTAGES

The present invention allows that any who uses a local network, for instance Internet, can communicate with equipments in a public network and that debiting at that can be performed in a clear-cut way. The invention further allows that a simple procedure is achieved for paying of communications in different types of networks which normally are not equipped with debiting systems connected to each other. The introduction of means of payment, stamps, which are stored in a message center and which are earmarked for certain user/users, to a great extent facilitates the possibility of debiting. The possibility to, from a public network, purchase the mentioned stamps, to a high degree facilitates the users possiblity to use different networks connected to a public network.

DESCRIPTION OF FIGURES

FIG. 4 shows how a message center, C, is built-in in the local network, A, at the same time as an SMS-function, D, is built-in in the public network, B.

FIG. 5 shows how the message center, C, and SMS, D, are arranged on the connection between the local network, A, and the public network, B.

FIG. 9 shows a possible table for how stamps can be administered according to the invention.

DETAILED EMBODIMENT

In the following the invention is described on the basis of the figures and the terms therein.

Figure 1:
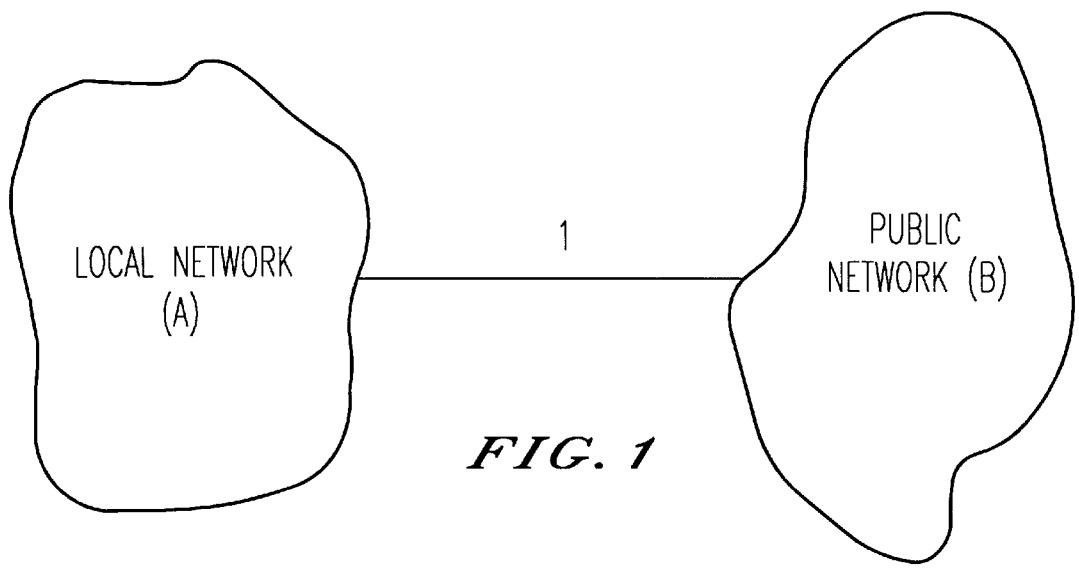
FIG. 1 shows the traditional interconnection of a local network, A, and a public network, B, via a connection, 1.

In the following the invention is described on the basis of a system according to FIG. 1, where a local network, A, is connected via a connection, 1, with a public network, B. The public network can in itself be just any public network. In the public network is performed call charging for established connections between users in the system. In the local network no call charging is made for used connection at communication between terminals. A user in the local network can via the connection 1 establish contact with subscribers in the public network, B. At such a connection charging functions are consequently lacking towards the user in the local network. An introduction of debiting system in the public network, B, in connection with that users in the local network, A, connect themselves to the public network implies difficulties in that the users in the local networks are not clear-cut identified. Risk accordingly exists in these cases that wrong debiting is obtained.

Figure 2:
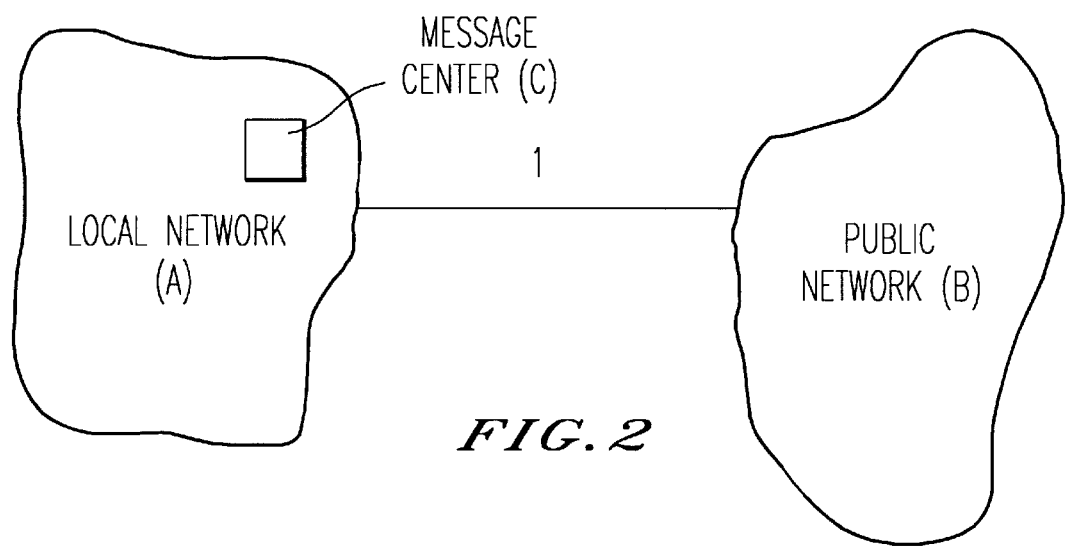
FIG. 2 shows corresponding system where a message center, C, is introduced in the local network, A.
Figure 3:
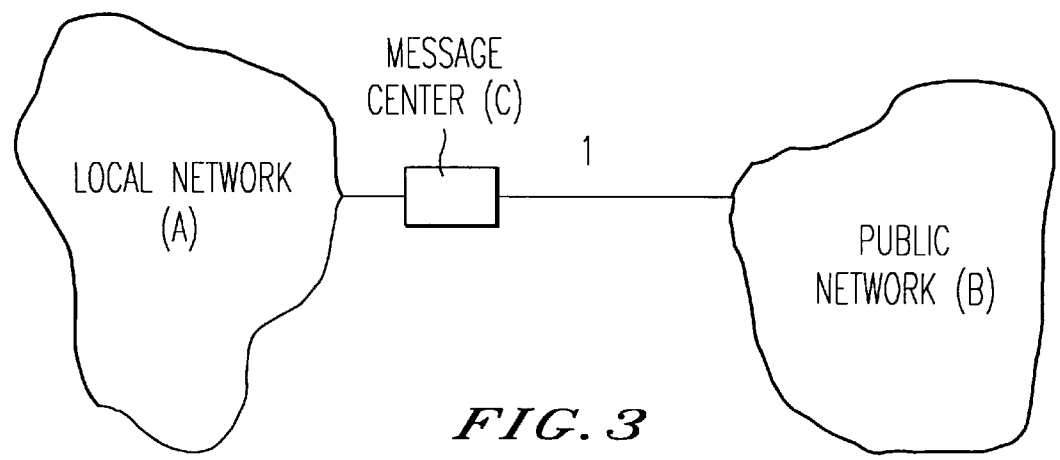
FIG. 3 shows how the message center, C , is introduced in the connection, 1, the local network, A, and the public network, B.

In connection with message transmission between users in the local network and the public network information is transmitted and stored via a message center, C, where the information can be stored, as is illustrated in FIGS. 2 and 3. In the public network there is further a system, D, called SMS (Short Message Service) arranged in the system. By means of SMS, subscribers in the public network can create and receive short text messages on subscriber equipments which are intended for this purpose. SMS, D, is connectable in the public network, B, according to FIG. 4, or on the connection between the local network and the public network according to FIG. 5. At message transmission between the network, the message center, C, and SMS, D, accordingly manages the information interchange between themselves, and the transmission of information to/from respective users and subscribers.

Figure 6:
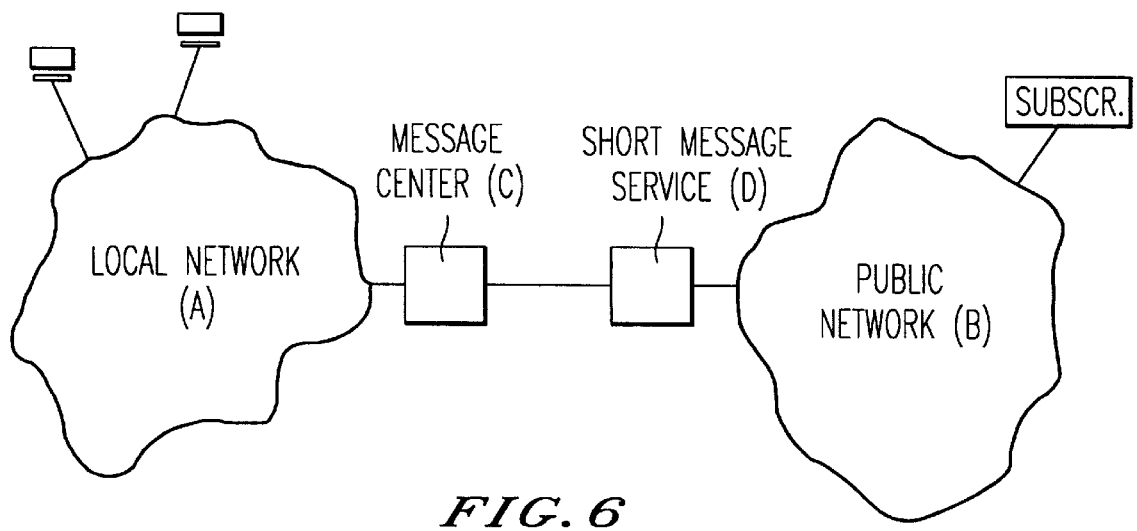
FIG. 6 shows the same as FIG. 5, but where the connection of users in the local network and the public network has been indicated.

A subscriber uses a subscriber equipment, subscr., in FIG. 6 and is connected to a public network, B. The subscriber gets stamps by connecting himself/herself to the message center, C. The subscriber equipment is clear-cut identified in the public network by its allotted subscriber number. The connection to the message center can in itself be made in different ways, for instance direct or via SMS-function. At connection via SMS the SMS-message is received from the subscriber and transferred in the form of one for the local network receivable information. The subscriber in this case states the number of stamps which shall be purchased, at which the stamps are allotted different stamp numbers; further are noted date of issue and to whom the stamp is issued, further is noted time of validity and other information. The information is after that forwarded to an appointed user in the local network. The user obtains information about the allocation of the mentioned stamps and which stamp numbers that have been obtained. The user after that has possibility to use the stamps for transmission of messages from the local network to the public network. In connection with the transmission the user states the number of the stamp to be used. The message center identifies the stamp and examines whether this is valid. If the stamp is not valid, the mentioned communication is refused. If the stamp however approved of, the message is forwarded to subscriber in the public network.

Stamps which are not taken out within the indicated validity time are removed from the system at the indicated point of time.

The payment for the stamps can in itself be made in different ways and at different points of time. It is consequently possible to take out remuneration for the stamps in connection with the order. In other variants it can be advantageous to charge in connection with the use of the stamps. In both cases the subscriber in the public network is debited.

Another variant of allocation of stamps is that subscriber in the public network, B, in connection with a message to a user in the local network makes the message center allot the receiver a reply stamp at the sender's expense. Reply stamps can in this case only be used for transmission of answer messages to the issuing subscriber. The validity of the stamps for different purposes can consequently be broadly varied by the validity for the stamps being allotted one or more receivers in the local network, and the mentioned stamps being used for answer only to certain appointed subscribers in the public network, or to groups respective to just any subscriber in the public network. The invention consequently allows a broad use.

Figure 7:
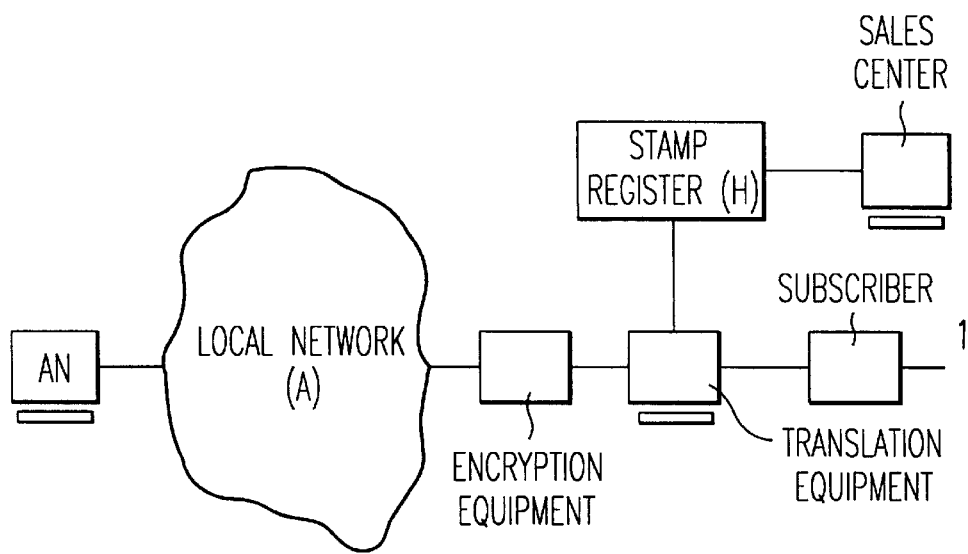
FIG. 7 shows more in detail the different function units in the message center which are of importance for the invention.
Figure 8:
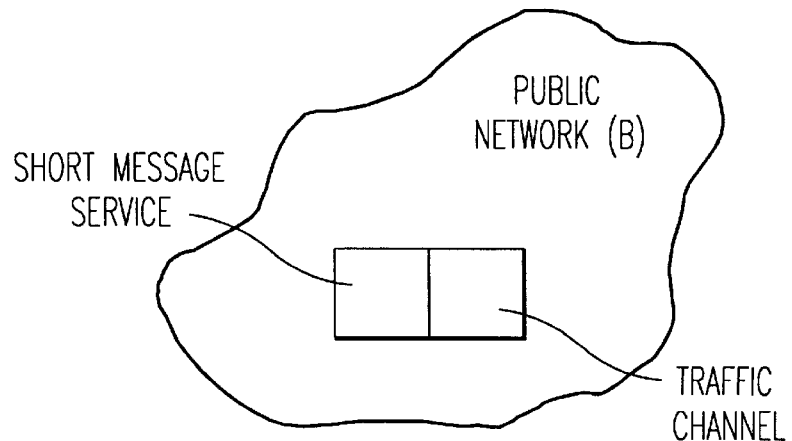
FIG. 8 shows the public network, B, and how SMS, K, and the traffic channel, L, are included in a public network, for instance a GSM-network.

It is further also possible to charge a certain cost in connection with the ordering of the stamps and the rest of the fee in connection with the use of the mentioned stamps. In FIG. 7 is shown the managing in more details. In this case an encryption equipment, E, is arranged between the public network and an equipment for translation/change between SMS and the local network and vice versa. The encryption function, E, is not necessary. From the equipment, F, for change/translation between SMS and the local network a stamp register, H, is connected. In the stamp register is stored registered purchases of stamps. To the stamp register can further direct connections exist from sale centers which sell stamps to those who want access to these for communication from the local network to the public network. The subscribers at this obtain for instance a diskette with wanted number of stamps at the same time as registering is made in the stamp register.

The stamps, in the following called stamps respective E-stamps, have the following functions. E-stamps are an extension and improvement of the idea with "supplied answer path" which is prepared in the GSM-recommendations. Here the description is divided into two parts, "reply" and the more general solution "general stamp".

In the following description are used the concepts Internet user, which relates to the user who via his/her personal computer is connected to Internet, local network and the GSM-subscriber, the subscriber in the public network which has contact with Internet via SMS.

When GSM-subscriber sends an E-mail to a subscriber connected to Internet, the customer is debited in normal way for his/her SMS-message. The charge can for instance be half of that for an SMS-communication between subscribers, mobiles in the public network, because these are only used in one direction. If the subscriber chooses "supplied answer path" the customer is debited full SMS-charge, and received mail can look as follows. Example of mail:

Example of mail:
From: gsm0705123456@tg.se
To: user@chk.mobitel.telia.se
Subject: SMS-message.
The text here is the SMS-messgae itself which in the GSM-case has the lenght of 160 characters.

This mail is sent from a Telia GSM-connected mobile telephone. You can free of charge make a reply to this message containing max. 160 characters. The message shall be written in the subject field and the following line must be included somewhere in the message.

ESTAMP: dje8ef458HREh54Kr45KJ54RFR5746 VAL: 9506713
to: gsm 0705123456
End of example.
The message contains beside customary header:
the text itself which is transmitted via SMS.
a standard explanation which describes to the receiver how for instance Telia's, E-mail service operates.
A stamp, so called E-stamp.

The receiver can now make a reply, answer, on the mail and this will be returned to the GSM-subscriber if the answer is written before the validity date which is indicated after VAL on the E-stamp line (for instance 14 days).

If the stamp has not been used within this time the GSM-subscriber can be repayed for the costs for the stamp. The repayment can relate to the whole sum or parts thereof.

A more general method to use E-stamps is general stamp which requires some adjustment on the part of the local network connected user. This method can be used in parallell with the above described reply-method. The local network connected user purchases stamps from his GSM-telephone by transmitting an SMS to E-mail. The message can look as follows.

:X:10:QWERKY.

The receiver of the message shall be the Internet-user, local network user, who shall obtain the stamps. The message is identified by the message center by :X:. The FIG. 10 indicates the wanted number of stamps which also will be debited on the sender's telephone invoice. The price for the order is decided by the operator in the public network. The subscriber then chooses a key to secure that only he himself can use the stamps (in this case QWERKY). This code/key shall be known to the receiver.

The received message is ASCII-encrypted. With ASCII-encrypted is here meant that the mail consists of ASCII-characters (large/small characters and digits) in an encrypted sequence which only can be encrypted with knowledge of the coded key. The mail server, C, which is placed locally at the Internet user, AN, realize that the mail contains stamps and these will be decrypted and extracted and saved on a local file. Stamps which have been decrypted have the same appearance as the E-stamp line in the description above.

Each stamp is saved in the mail server, and when mail shall be sent to GSM-subscriber, one of these stamps are enclosed, which after that is used up. The stamp itself, E-stamp, consists in this example of 30 ASCII-characters. Large/small characters plus 0 to 9 gives 62 symbols. These result in $62^{30}$ unique stamps.

A random, not previously used number is automatically chosen by the message managing. This number is stored in a data base together with:

date of validity, when the validity period is up the stamp is wiped out from the data base and the GSM- subscriber gets the payment back if the stamp is not used.

the identity of the GSM-subscriber to make possible repayment; in the case with "reply stamps" also this identity is the only possible receiver of the mail.

"Reply stamps" are not encrypted. This to facilitate the managing if not special software is available on the Internet-user's side.

A "general stamp"-order is however more valuable because:

the message contains more stamps.

the stamps can be regarded as means of payment because they can be used towards any Telia GSM-subscriber.

The description of how the mail management is used practically is here based on a UNIX-environment, which is not a demand. Modern mail tools can of course manage this quite automatically.

An example of encryption algorithm is described later.

A program, stamp, need to be installed on the system. Each user as well puts the file .gsmkev in his root, which he should read- and write-protect from other users.

In this file the user can write an arbitrary number of keys, one per line. In our example the key QWERKY should consequently be included. When a stamp order arrives it is quite simply introduced in stamp:

stamp<stampfilc

Stamp will then check the code keys in the file .gsmkey one by one until a correct one is found. The mail is encrypted with a random frequency, the seed of which is calculated from the keyword.

The program stamp will now add the received stamps in the file .gsmstamps which is also located in the users root.

A mail is today sent from UNIX/:

cat textfile|mail user @hk.mobitel. telia. se if mail shall be sent to a GSM-subscriber@is instead used cat textfile|stamp|mail gsm0705123456@tg.se stamp will here divide the mail in part of 150 characters and transmits each part separately together with an extracted stamp from the file .gsmstamps.

If a mail with key order ends up in a wrong place/is lost, there is no harm. A wrong receiver can not decrypt the stamps and not used stamps are not debited the customer.

The debiting can be made either at the ordering of the stamps or when they are used.

Companies can of course arrange a superimposed central stamp server which automatically stamps all from the company sent mails, or only those to a certain number given telephones.

There are several different ways of encrypting data. How this shall be performed is not comprised in this description. On example of a possible principle is however given:

suppose that the key word is: kalas

| letter: | K | A | L | A | S |
|---|---|---|---|---|---|
| number: | 10 | 0 | 11 | 0 | 18 |
| weight | 1 | 1E2 | 1E4 | 1E6 | 1E8 | the characters are translated into figures according to the principle A=0, B=1, etc.

each character is multiplied with a weight according to the table above.

the code key is calculated as the scale product of numbers and the weight lines.

Code Key=1800110010

Most programming languages offers a random number generator with varying quality and frequency spectrum. How such an algorithm is looking is not described here. In common for all elementary algorithms are however that they must be initiated by a seed. For a given seed is always obtained exactly the same sequence of output data, where the values are random in relation to each other.

The idea is now that the code key is used as seed to both the encoder and the decoder and therefore generates exactly the same code sequence. Suppose that we want to encrypt the word E-mail.

| character | E | M | A | I | L |
|---|---|---|---|---|---|
| number | 4 | 12 | 0 | 8 | 11 |
| random | 45 | 34 | 97 | 76 | 34 |
| sum | 49 | 46 | 97 | 84 | 45 |
| rest | 23 | 20 | 19 | 6 | 19 |
| character | X | U | T | G | T | the character is translated into a number according to the same principle as above.

random is a random number sequence which is generated from the key.

sum is the sum of the representation of each character and the random number sequence.

rest is the rest from the division between the sum and 26 (which is the number of characters in the alphabet).

this figure is translated back to characters at which the encrypted sequence is obtained.

It should be rather evident that this procedure is simply reversible to recreate the original message.

I claim:

1. A communication system comprising:

a first communications device configured to send an audio signal to another first communications device within a first communications subsystem, said first communications subsystem debiting at least one of said first communications device and said another first communications device in response to said audio signal having been sent;

a second communication device configured to send another signal including text information within a second communications subsystem without being debited by said second communications system; and a connection mechanism that selectively connects said first communications device in said first communications subsystem to said second communications device in said second communications subsystem in response to receiving a connection request, said connection mechanism comprising, a charge interval issuing mechanism configured to assign a number of charge intervals to said first communications device and said second communications device in exchange for a corresponding payment amount made on behalf of at least one of said first communications device and said second communications device, respective of said charge intervals comprising an attribute that includes at least one of having a separately identifiable code, being individually assignable to a user, having a security key, and having an expiration time, an associative mechanism configured to associate said connection request from one of said first communications device and said second communications device with said number of charge intervals, and a payment register configured to connect said first communications device to said second communications device when said number of charge intervals exceeds a predetermined number in response to receiving said connection request and subsequently decrementing said number of charge intervals by an amount corresponding to a usage amount of said connection mechanism, said payment register also being configured to not connect said first communications device and said second communications device when said number of charge intervals is equal to or less than said predetermined number.

2. The communications system of claim 1, wherein:
said charge interval issuing mechanism is configured to issue a plurality of stamps as said number of charging interval; and
said associative mechanism is configured to associate said connection request with either said first communications device or said second communications device.

3. The communications system of claim 2, wherein said charge interval issuing mechanism is configured to issue an individual code for respective of said plurality of stamps.

4. The communications system of claim 1, wherein:
said first communications device is configured to make an appointment of said second communications device as one of a certain group of devices and inform said payment register about said appointment; and
said payment register is configured to connect said first communications device to at least one of said certain group of devices appointed by said first communications device.

5. The communications system of claim 2, wherein said associative mechanism is configured to associate said connection request with a portion of said stamps, said portion of said stamps being appointed by at least one of said first communications device and said second communications device.

6. The communications system of claim 2, wherein said charge issuing mechanism is configured to assign a portion of said number of stamps for use by a receiving device for reply messages in response to a requesting device, said receiving device being said first communications device if said second communications device is said requesting device, and said receiving device being said second communications device if said first communications device is said requesting communications device.

7. The communications system of claim 1, wherein:
said first communications device is configured to operate with said first communications subsystem which comprises a public telecommunications network; and
said second communications device is configured to operate with said second communications subsystem which comprises a local network.

8. The communications system of claim 7, wherein said first communications subsystem is either connected to said payment register or comprises said payment register.

9. A communication system comprising:
a first communications device configured to send an audio signal to another first communications device within a first communications subsystem, said first communications subsystem debiting at least one of said first communications device and said another first communications device in response to said audio signal having been sent;
a second communication device configured to send another signal including text information within a second communications subsystem without being debited by said second communications system; and
a connection mechanism that selectively connects said first communications device in said first communications subsystem to said second communications device in said second communications subsystem in response to receiving a connection request, said connection mechanism comprising,
a charge interval issuing mechanism configured to assign a number of charge intervals to said first communications device and said second communications device in exchange for a corresponding payment amount made on behalf of at least one of said first communications device and said second communications device,
an associative mechanism configured to associate said connection request from one of said first communications device and said second communications device with said number of charge intervals, and
a payment register configured to connect said first communications device to said second communications device when said number of charge intervals exceeds a predetermined number in response to receiving said connection request and subsequently decrementing said number of charge intervals by an amount corresponding to a usage amount of said connection mechanism, said payment register also being configured to not connect said first communications device and said second communications device when said number of charge intervals wherein,
said first communications device is configured to operate with said first communications subsystem which comprises a public telecommunications network,
said second communications device is configured to operate with said second communications subsystem which comprises a local network,
said first communications subsystem is either connected to said payment register or comprises said payment register, and
said payment register is configured to serve as an intermediate communications link between said public telecommunications network and the local network.

10. The communications system of 9, wherein said connection mechanism comprises a message register which comprises said payment register.

11. The communications system of claim 7, wherein said public telecommunications network comprises a text management mechanism configured to manage signals comprising said text information.

12. The communications system of claim 7, wherein said public telecommunications system comprises a mobile communications system.

13. The communications system of claim 12, wherein said mobile communications system comprises a digital mobile communications system.

14. The communications system of claim 13, wherein said digital mobile communications system comprises a GSM-network.

15. The communications system of claim 11, wherein said text management mechanism is connected to a public network portion of said public telecommunications network.

16. A communication system comprising:
a first communications device configured to send an audio signal to another first communications device within a first communications subsystem, said first communications subsystem debiting at least one of said first communications device and said another first communications device in response to said audio signal having been sent;

a second communication device configured to send another signal including text information within a second communications subsystem without being debited by said second communications system; and a connection mechanism that selectively connects said first communications device in said first Communications subsystem to said second communications device in said second communications subsystem in response to receiving a connection request, said connection mechanism comprising, a charge interval issuing mechanism configured to assign a number of charge intervals to said first communications device and said second communications device in exchange for a corresponding payment amount made on behalf of at least one of said first communications device and said second communications device, an associative mechanism configured to associate said connection request from one of said first communications device and said second communications device with said number of charge intervals, and a payment resister configured to connect said first communications device to said second communications device when said number of charge intervals exceeds a predetermined number in response to receiving said connection request and subsequently decrementing said number of charge intervals by an amount corresponding to a usage amount of said connection mechanism, said payment register also being configured to not connect said first communications device and said second communications device when said number of charge intervals wherein, said charge interval issuing mechanism is configured to issue a plurality of stamps as said number of charging interval, said associative mechanism is configured to associate said connection request with either said first communications device or said second communications device, and said payment register is configured to hold information associated with each of said stamps, said information comprising a date of issue, a user to whom said stamp is issued, and a time of validity.

17. A communication system comprising:

a first communications device configured to send an audio signal to another first communications device within a first communications subsystem, said first communications subsystem debiting at least one of said first communications device and said another first communications device in response to said audio signal having been sent;

a second communication device configured to send another signal including text information within a second communications subsystem without being debited by said second communications system; and a connection mechanism that selectively connects said first communications device in said first communications subsystem to said second communications device in said second communications subsystem in response to receiving a connection request, said connection mechanism comprising, a charge interval issuing mechanism configured to assign a number of charge intervals to said first communications device and said second communications device in exchange for a corresponding payment amount made on behalf of at least one of said first communications device and said second communications device, an associative mechanism configured to associate said connection request from one of said first communications device and said second communications device with said number of charge intervals, and a payment register configured to connect said first communications device to said second communications device when said number of charge intervals exceeds a predetermined number in response to receiving said connection request and subsequently decrementing said number of charge intervals by an amount corresponding to a usage amount of said connection mechanism, said payment register also being configured to not connect said first communications device and said second communications device when said number of charge intervals wherein said charge interval issuing mechanism is configured to issue a plurality of stamps as said number of charging interval; and said associative mechanism is configured to associate said connection request with either said first communications device or said second communications device; and said connection mechanism is configured to provide at least one of said first communications device and said second communications device with a key for respective of said stamps.

18. The communications system of claim 1, wherein said first communications device comprises a display on which messages are prepared and displayed.

19. A communication system comprising:

a first communications device configured to send an audio signal to another first communications device within a first communications subsystem, said first communications subsystem debiting at least one of said first communications device and said another first communications device in response to said audio signal having been sent;

a second communication device configured to send another signal including text information within a second communications subsystem without being debited by said second communications system; and a connection mechanism that selectively connects said first communications device in said first communications subsystem to said second communications device in said second communications subsystem in response to receiving a connection request, said connection mechanism comprising, a charge interval issuing mechanism configured to assign a number of charge intervals to said first communications device and said second communications device in exchange for a corresponding payment amount made on behalf of at least one of said first communications device and said second communications device, an associative mechanism configured to associate said connection request from one of said first communications device and said second communications device with said number of charge intervals, and a payment register configured to connect said first communications device to said second communications device when said number of charge intervals exceeds a predetermined number in response to receiving said connection request and subsequently decrementing said number of charge intervals by an amount corresponding to a usage amount of said connection mechanism, said payment register also being configured to not connect said first communications device and said second communications device when said number of charge intervals, wherein said first communications device comprises a display on which messages are prepared and displayed, and said connection mechanism comprises a repayment mechanism configured to cause a repayment associated with one or more of said stamps which have not been used within a predetermined period of time.

* * * * *

UNITED STATES PATENT AND TRADEMARK OFFICE
CERTIFICATE OF CORRECTION

PATENT NO. : 6,081,703

DATED       : June 27, 2000

INVENTOR(S): Per Hallqvist

It is certified that an error appears in the above-identified patent and that said Letters Patent is hereby corrected as shown below:

On the Title Page, Item [30] the Foreign Application Priority Data is missing, it should read as follows:

[30]            Foreign Application Priority Data

Jul. 10, 1995   [SE]    Sweden ................................. 9502533-4

Signed and Sealed this

First Day of May, 2001

Attest:

NICHOLAS P. GODICI

Attesting Officer    Acting Director of the United States Patent and Trademark Office